(12) United States Patent
Kunjithapatham et al.

(10) Patent No.: US 8,510,453 B2
(45) Date of Patent: Aug. 13, 2013

(54) FRAMEWORK FOR CORRELATING CONTENT ON A LOCAL NETWORK WITH INFORMATION ON AN EXTERNAL NETWORK

(75) Inventors: Anugeetha Kunjithapatham, Sunnyvale, CA (US); Mithun Sheshagiri, Berkeley, CA (US); Phuong Nguyen, San Jose, CA (US); Priyang Rathod, Mountain View, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 493 days.

(21) Appl. No.: 11/726,340

(22) Filed: Mar. 21, 2007

(65) Prior Publication Data
US 2008/0235393 A1    Sep. 25, 2008

(51) Int. Cl.
*G06F 15/16*    (2006.01)
(52) U.S. Cl.
USPC .............. 709/228; 707/999.003; 705/26.1
(58) Field of Classification Search
USPC .......................................... 709/208
See application file for complete search history.

(56) References Cited

U.S. PATENT DOCUMENTS

| | | | |
|---|---|---|---|
| 5,616,876 A * | 4/1997 | Cluts ............................ | 84/609 |
| 5,790,935 A | 8/1998 | Payton | |
| 5,918,223 A * | 6/1999 | Blum et al. ...................... | 1/1 |
| 5,974,406 A | 10/1999 | Bisdikian et al. | |
| 5,983,214 A | 11/1999 | Lang et al. | |
| 5,983,237 A | 11/1999 | Jain et al. | |
| 5,995,959 A | 11/1999 | Friedman et al. | |
| 6,151,603 A | 11/2000 | Wolfe | |
| 6,253,238 B1 | 6/2001 | Lauder et al. | |
| 6,334,127 B1 | 12/2001 | Bieganski et al. | |
| 6,412,073 B1 | 6/2002 | Rangan | |
| 6,438,579 B1 | 8/2002 | Hosken | |
| 6,480,844 B1 | 11/2002 | Cortes et al. | |
| 6,564,210 B1 * | 5/2003 | Korda et al. ..................... | 1/1 |
| 6,564,213 B1 * | 5/2003 | Ortega et al. .................... | 1/1 |
| 6,637,028 B1 | 10/2003 | Voyticky et al. | |

(Continued)

FOREIGN PATENT DOCUMENTS

| | | |
|---|---|---|
| CN | 1393107 | 1/2003 |
| CN | 1585947 | 2/2005 |

(Continued)

OTHER PUBLICATIONS

Notification of Transmittal of the International Search Report and the Written Opinion of the International Search Authority Application No. PCT/KR2008/000537 dated May 15, 2008, 16 pages.

(Continued)

*Primary Examiner* — Hamza Algibhah
(74) *Attorney, Agent, or Firm* — Kenneth L. Sherman, Esq.; Michael Zarrabian, Esq.; Sherman & Zarrabian LLP (57) ABSTRACT

A correlation system and method implement a framework for correlating content available from a local network with information on an external network. The system identifies information related to content available on the local network of interest to the user and also identifies one or more external sources that contain such related information. Then the system extracts data related to the identified information from the external sources, and determines correlations between the identified information and the data extracted from the external network.

32 Claims, 4 Drawing Sheets

(56) References Cited

U.S. PATENT DOCUMENTS

| | | |
|---|---|---|
| 6,721,748 B1 | 4/2004 | Knight et al. |
| 6,766,523 B2 | 7/2004 | Herley |
| 6,774,926 B1 | 8/2004 | Ellis et al. |
| 6,807,675 B1 | 10/2004 | Maillard |
| 6,826,512 B2 | 11/2004 | Dara-Abrams et al. |
| 6,842,877 B2 | 1/2005 | Robarts et al. |
| 6,954,755 B2 | 10/2005 | Reisman |
| 6,981,040 B1 | 12/2005 | Konig et al. |
| 7,028,024 B1 | 4/2006 | Kommers et al. |
| 7,054,875 B2 | 5/2006 | Keith, Jr. |
| 7,062,561 B1 | 6/2006 | Reisman |
| 7,069,575 B1 | 6/2006 | Goode et al. |
| 7,110,998 B1 | 9/2006 | Bhandari et al. |
| 7,158,961 B1 | 1/2007 | Charikar |
| 7,158,986 B1 | 1/2007 | Oliver et al. |
| 7,162,473 B2 | 1/2007 | Dumais et al. |
| 7,165,080 B2 | 1/2007 | Kotcheff et al. |
| 7,181,438 B1 | 2/2007 | Szabo |
| 7,194,460 B2 | 3/2007 | Komamura |
| 7,203,940 B2 | 4/2007 | Barmettler et al. |
| 7,225,187 B2 | 5/2007 | Dumais et al. |
| 7,283,992 B2 * | 10/2007 | Liu et al. .................. 1/1 |
| 7,284,202 B1 | 10/2007 | Zenith |
| 7,343,365 B2 | 3/2008 | Farnham et al. |
| 7,363,294 B2 | 4/2008 | Billsus et al. |
| 7,386,542 B2 | 6/2008 | Maybury et al. |
| 7,389,224 B1 | 6/2008 | Elworthy |
| 7,389,307 B2 | 6/2008 | Golding |
| 7,433,935 B1 | 10/2008 | Obert |
| 7,483,921 B2 | 1/2009 | Tsuzuki et al. |
| 7,552,114 B2 | 6/2009 | Zhang et al. |
| 7,565,345 B2 | 7/2009 | Bailey et al. |
| 7,577,718 B2 * | 8/2009 | Slawson et al. .............. 709/218 |
| 7,593,921 B2 | 9/2009 | Goronzy et al. |
| 7,603,349 B1 | 10/2009 | Kraft et al. |
| 7,613,736 B2 * | 11/2009 | Hicken .................. 1/1 |
| 7,617,176 B2 | 11/2009 | Zeng et al. |
| 7,634,461 B2 | 12/2009 | Oral et al. |
| 7,657,518 B2 | 2/2010 | Budzik et al. |
| 7,685,192 B1 | 3/2010 | Scofield et al. |
| 7,716,158 B2 | 5/2010 | McConnell |
| 7,716,199 B2 | 5/2010 | Guha |
| 7,725,486 B2 | 5/2010 | Tsuzuki et al. |
| 7,793,326 B2 | 9/2010 | McCoskey |
| 8,028,323 B2 * | 9/2011 | Weel .................. 725/141 |
| 8,090,606 B2 * | 1/2012 | Svendsen .................. 705/7.11 |
| 8,200,688 B2 * | 6/2012 | Messer et al. .................. 707/767 |
| 2001/0003214 A1 | 6/2001 | Shastri et al. |
| 2001/0023433 A1 | 9/2001 | Natsubori et al. |
| 2002/0002899 A1 * | 1/2002 | Gjerdingen et al. .............. 84/667 |
| 2002/0022491 A1 * | 2/2002 | McCann et al. .............. 455/456 |
| 2002/0026436 A1 | 2/2002 | Joory |
| 2002/0032693 A1 * | 3/2002 | Chiou et al. .................. 707/500 |
| 2002/0087535 A1 * | 7/2002 | Kotcheff et al. .................. 707/5 |
| 2002/0147628 A1 * | 10/2002 | Specter et al. .................. 705/10 |
| 2002/0161767 A1 * | 10/2002 | Shapiro et al. .................. 707/9 |
| 2002/0162121 A1 | 10/2002 | Mitchell |
| 2003/0009537 A1 * | 1/2003 | Wang .................. 709/219 |
| 2003/0028889 A1 | 2/2003 | McCoskey |
| 2003/0033273 A1 * | 2/2003 | Wyse .................. 707/1 |
| 2003/0070061 A1 | 4/2003 | Wong et al. |
| 2003/0105682 A1 * | 6/2003 | Dicker et al. .................. 705/27 |
| 2003/0131013 A1 * | 7/2003 | Pope et al. .................. 707/100 |
| 2003/0158855 A1 | 8/2003 | Farnham et al. |
| 2003/0172075 A1 | 9/2003 | Reisman |
| 2003/0184582 A1 * | 10/2003 | Cohen .................. 345/736 |
| 2003/0221198 A1 | 11/2003 | Sloo |
| 2003/0229900 A1 | 12/2003 | Reisman |
| 2003/0231868 A1 | 12/2003 | Herley |
| 2004/0031058 A1 | 2/2004 | Reisman |
| 2004/0073944 A1 | 4/2004 | Robert |
| 2004/0107821 A1 * | 6/2004 | Alcalde et al. .................. 84/608 |
| 2004/0194141 A1 | 9/2004 | Sanders |
| 2004/0220925 A1 * | 11/2004 | Liu et al. .................. 707/3 |
| 2004/0244038 A1 | 12/2004 | Utsuki et al. |
| 2004/0249790 A1 | 12/2004 | Komamura |
| 2005/0004910 A1 * | 1/2005 | Trepess .................. 707/5 |
| 2005/0137966 A1 | 6/2005 | Billsus et al. |
| 2005/0144158 A1 | 6/2005 | Capper et al. |
| 2005/0154711 A1 | 7/2005 | McConnell |
| 2005/0160460 A1 | 7/2005 | Fujiwara et al. |
| 2005/0177555 A1 | 8/2005 | Alpert et al. |
| 2005/0240580 A1 * | 10/2005 | Zamir et al. .................. 707/4 |
| 2005/0246726 A1 | 11/2005 | Labrou et al. |
| 2005/0289599 A1 | 12/2005 | Matsuura et al. |
| 2006/0026152 A1 | 2/2006 | Zeng et al. |
| 2006/0028682 A1 | 2/2006 | Haines |
| 2006/0036593 A1 | 2/2006 | Dean et al. |
| 2006/0066573 A1 | 3/2006 | Matsumoto |
| 2006/0074883 A1 | 4/2006 | Teevan et al. |
| 2006/0084430 A1 * | 4/2006 | Ng .................. 455/426.1 |
| 2006/0095415 A1 | 5/2006 | Sattler et al. |
| 2006/0133391 A1 | 6/2006 | Kang et al. |
| 2006/0136670 A1 * | 6/2006 | Brown et al. .................. 711/118 |
| 2006/0156252 A1 | 7/2006 | Sheshagiri et al. |
| 2006/0156326 A1 | 7/2006 | Goronzy et al. |
| 2006/0161542 A1 | 7/2006 | Cucerzan et al. |
| 2006/0195362 A1 * | 8/2006 | Jacobi et al. .................. 705/14 |
| 2006/0210157 A1 | 9/2006 | Agnihotri et al. |
| 2006/0242283 A1 * | 10/2006 | Shaik et al. .................. 709/223 |
| 2007/0043703 A1 * | 2/2007 | Bhattacharya et al. .......... 707/3 |
| 2007/0050346 A1 * | 3/2007 | Goel et al. .................. 707/3 |
| 2007/0061222 A1 * | 3/2007 | Allocca et al. .................. 705/26 |
| 2007/0061352 A1 * | 3/2007 | Dimitrova et al. .......... 707/102 |
| 2007/0073905 A1 | 3/2007 | Erickson et al. |
| 2007/0078822 A1 | 4/2007 | Cuzerzan et al. |
| 2007/0107019 A1 | 5/2007 | Romano et al. |
| 2007/0130585 A1 | 6/2007 | Perret et al. |
| 2007/0143266 A1 | 6/2007 | Tang et al. |
| 2007/0156447 A1 * | 7/2007 | Kim et al. .................. 705/1 |
| 2007/0179776 A1 | 8/2007 | Segond et al. |
| 2007/0198485 A1 | 8/2007 | Ramer et al. |
| 2007/0198500 A1 | 8/2007 | Lucovsky et al. |
| 2007/0208755 A1 * | 9/2007 | Bhatkar et al. .................. 707/10 |
| 2007/0214123 A1 | 9/2007 | Messer et al. |
| 2007/0214488 A1 | 9/2007 | Nguyen et al. |
| 2007/0220037 A1 | 9/2007 | Srivastava et al. |
| 2007/0233287 A1 | 10/2007 | Sheshagiri et al. |
| 2007/0300078 A1 * | 12/2007 | Ochi et al. .................. 713/189 |
| 2008/0040316 A1 | 2/2008 | Lawrence |
| 2008/0082744 A1 * | 4/2008 | Nakagawa .................. 711/113 |
| 2008/0097982 A1 * | 4/2008 | Gupta .................. 707/5 |
| 2008/0114751 A1 | 5/2008 | Cramer et al. |
| 2008/0133501 A1 * | 6/2008 | Andersen et al. .................. 707/5 |
| 2008/0133504 A1 | 6/2008 | Messer et al. |
| 2008/0162651 A1 | 7/2008 | Madnani |
| 2008/0162731 A1 * | 7/2008 | Kauppinen et al. .......... 709/250 |
| 2008/0183596 A1 | 7/2008 | Nash et al. |
| 2008/0183681 A1 | 7/2008 | Messer et al. |
| 2008/0183698 A1 | 7/2008 | Messer |
| 2008/0204595 A1 | 8/2008 | Rathod et al. |
| 2008/0208839 A1 | 8/2008 | Sheshagiri et al. |
| 2008/0235209 A1 | 9/2008 | Rathod et al. |
| 2008/0235393 A1 | 9/2008 | Kunjithapatham et al. |
| 2008/0242279 A1 | 10/2008 | Ramer et al. |
| 2008/0250010 A1 | 10/2008 | Rathod et al. |
| 2008/0266449 A1 | 10/2008 | Rathod et al. |
| 2008/0288641 A1 | 11/2008 | Messer et al. |
| 2009/0029687 A1 | 1/2009 | Ramer et al. |
| 2009/0055393 A1 | 2/2009 | Messer |
| 2009/0070184 A1 * | 3/2009 | Svendsen .................. 705/10 |
| 2009/0077052 A1 * | 3/2009 | Farrelly .................. 707/5 |
| 2009/0077065 A1 | 3/2009 | Song et al. |
| 2009/0094339 A1 | 4/2009 | Allen et al. |
| 2009/0112848 A1 | 4/2009 | Kunjithapatham et al. |
| 2009/0119717 A1 | 5/2009 | Newton et al. |
| 2009/0248883 A1 | 10/2009 | Suryanarayana et al. |
| 2009/0288014 A1 | 11/2009 | Fujioka |
| 2010/0070895 A1 | 3/2010 | Messer |
| 2010/0191619 A1 * | 7/2010 | Dicker et al. .................. 705/27 |
| 2010/0257196 A1 | 10/2010 | Waters et al. |
| 2010/0281393 A1 | 11/2010 | Fujioka |
| 2011/0208768 A1 | 8/2011 | Mehanna |

FOREIGN PATENT DOCUMENTS

| | | |
|---|---|---|
| CN | 1723458 | 1/2006 |
| CN | 1808430 | 7/2006 |
| CN | 1848742 | 10/2006 |
| CN | 1906610 | 1/2007 |
| JP | 2003-099442 | 4/2003 |
| JP | 2004505563 | 2/2004 |
| JP | 2006/228198 | 8/2006 |
| JP | 2007/012013 | 1/2007 |
| KR | 10-2002-0005147 A | 1/2002 |
| KR | 10-2002-0006810 A | 1/2002 |
| KR | 10-2004-0052339 A | 6/2004 |
| KR | 10-2006-0027226 A | 3/2006 |
| WO | WO 01/37465 A2 | 5/2001 |
| WO | WO 02/43310 A2 | 5/2002 |
| WO | WO03/042866 | 5/2003 |
| WO | WO 2005/055196 A2 | 6/2005 |
| WO | WO2005/072157 | 8/2005 |
| WO | WO 2007/004110 A2 | 1/2007 |

OTHER PUBLICATIONS

Notification of Transmittal of the International Search Report and the Written Opinion of the International Searching Authority for International Application No. PCT/KR2008/001558, dated Jun. 26, 2008, 10 pages.

Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.

Apple Inc., Apple iTunes, http://www.apple.com/itunes/, Apr. 28, 2003, US.

Babaguchi, N. et al., "Intermodal Collaboration: A Strategy for Semantic Content Analysis for Broadcasted Sports Video," Proceedings on the 2003 International Conference of Image Processing, Sep. 2003, pp. 1-4, IEEE Publishing.

Brill, E., "A Simple Rule-Based Part of Speech Tagger," Proceedings of the Third Conference on Applied Natural Language Processing, Mar. 1992, pp. 152-155, Associate for Computational Linguistics, Morristown, NJ.

Google Inc., Google Search Engine, http://www.google.com, Aug. 1998, US.

Google Inc., Google Desktop Search, http://desktop.google.com, Oct. 15, 2004, US.

Henzinger, M. et al., "Query-Free News Search," Proceedings on the 12th International Conference on World Wide Web, May 2003, pp. 1-10, ACM Press, New York, NY.

Livingston, K. et al., "Beyond broadcast: a demo," Proceedings of the 8th international Conference on intelligent User interfaces, Jan. 2003, ACM Press, New York, NY.

Microsoft Corporation, Microsoft Windows Media Player, http://www.microsoft.com/windows/windowsmedia/, Feb. 1999, US.

Microsoft Corporation, MSN TV, http://www.webtv.com/pc, Feb. 2006, US.

Opera Software ASA, Opera Browser for Devices, http://www.opera.com/products/devices/, Mar. 2006, US.

Rau Lisa, F. et al, "Domain-independent summarization of news," Summarizing Text for Intelligent Communication, Jun. 1994, pp. 71-75, Dagstuhl, Germany.

Spalti, M., "Finding and Managing Web Content with Copernic 2000," Library Computing, Sep. 2000, pp. 217-221, vol. 18, No. 3, Westport.

Tjondronegoro, D. et al., "Extensible Detection and Indexing of Highlight Events in Broadcasted Sports Video," Proceedings of the 29th Australasian Computer Science Conference, Jan. 2006, pp. 237-246, Hobart, Australia.

Wachman, J. et al., "Tools for Browsing a TV Situation Comedy Based on Content Specific Attributes," Multimedia Tools and Applications, Mar. 2001, pp. 255-284, vol. 13, No. 3, US.

Yahoo Inc., Yahoo Search Engine, http://search.yahoo.com, Dec. 1998, US.

Zhuang, Y. et al, "Applying Semantic Association to Support Content-Based Video Retrieval," International workshop on Very Low Bitrate Video Coding (VLBV'98), Oct. 1998, US.

Microsoft Corporation, Microsoft Windows Media Player 10, http://www.microsoft.com/windows/windowsmedia/mp10, Jun. 2004, US.

Realnetworks, Inc., http://www.real.com, Jun. 1997, US.

Copernic Inc., Copernic Search Engine for your PC, http://www.copernic.com, Sep. 19, 2008, US.

Miyamori, H. et al., "Webified Video: Media Conversion from TV Programs to Web Content for Cross-Media Information Integration," Proceedings of the 16th International Conference on Database and Expert Systems Applications, 2005, pp. 176-185, Springer—Verlag, Berlin, Heidelberg.

Moraveji, N. et al., "DynaLine: A Non-Disruptive TV User Interface for Passive Browsing of Internet Video," Microsoft Research Technical Report, 2006, pp. 1-4.

Livingston, K. et al., "Beyond Broadcast," 8th International Conference on Intelligent User Interfaces, Jan. 2003, pp. 260-262, Association for Computing Machinery, New York, NY.

U.S. Non-final Office Action for U.S. Appl. No. 12/056,184 mailed on Jun. 11, 2010.

U.S. Final Office Action for U.S. Appl. No. 12/056,184 mailed on Nov. 23, 2010.

U.S. Non-final Office Action for U.S. Appl. No. 11/732,887 mailed on Jun. 5, 2009.

U.S. Final Office Action for U.S. Appl. No. 11/969,778 mailed on Sep. 2, 2010.

U.S. Non-final Office Action for U.S. Appl. No. 11/969,778 mailed on Apr. 19, 2010.

Notification of Transmittal of the International Search Report and the Written Opinion of the international Searching Authority; International Search Report and Written Opinion of the International Searching Authority for Application No. PCT/KR2008/000537 dated May 15, 2008, 16 pages.

U.S. Non-final Office Action for U.S. Appl. No. 11/808,826 mailed on Jul. 24, 2009.

Vechtomova, O. et al., "Query expansion with terms selected using lexical cohesion analysis of documents", Information Processing and Management: an International Journal, Oct. 2006, pp. 849-865, vol. 43, No. 4, Pergamon Press Inc., Tarrytown, New York, United States.

U.S. Final Office Action for U.S. Appl. No. 11/633,880 mailed Oct. 28, 2010.

U.S. Non-final Office Action for U.S. Appl. No. 11/725,865 mailed Sep. 14, 2010.

U.S. Final Office Action for U.S. Appl. No. 11/713,350 mailed Sep. 9, 2010.

U.S. Non-final Office Action for U.S. Appl. No. 11/633,880 mailed May 11, 2010.

AOL LLC, http://www.aol.com, downloaded Sep. 19, 2008, pp. 1-2, United States.

Ask Search Engine, http://www.ask.com, downloaded Sep. 19, 2008, pp. 1, United States.

U.S. Advisory Action for U.S. Appl. No. 11/633,880 mailed Nov. 25, 2009.

U.S. Non-final Office Action for U.S. Appl. No 11/900,847 mailed Oct. 28, 2009.

"Placement in the DMOZ.org directory—Pure Power", DMOZ / Google Directory, posted on Apr. 30, 2005, p. 1, http://www.ahfx.net/weblog/13.

U.S. Office Action for U.S. Appl. No. 11/633,880 mailed Jan. 6, 2009.

U.S. Office Action for U.S. Appl. No. 11/633,880 mailed Aug. 10, 2009.

U.S. Final Office Action for U.S. Appl. No. 11/713,350 mailed Mar. 2, 2009.

U.S. Final Office Action for U.S. Appl. No. 11/713,350 mailed Aug. 14, 2009.

U.S. Non-final Office Action for U.S. Appl. No. 11/725,865 mailed Oct. 16, 2009.

U.S. Final Office Action for U.S. Appl. No. 11/725,865 mailed Mar. 16, 2010.

U.S. Non-final Office Action for U.S. Appl. No. 11/713,350 mailed Mar. 8, 2010.

U.S. Non-final Office Action for U.S. Appl. No. 11/808,826 mailed on Mar. 3, 2010.
U.S. Office Action for U.S. Appl. No. 12/263,089 mailed Mar. 25, 2011.
U.S. Office Action for U.S. Appl. No. 11/732,887 mailed on Dec. 4, 2009.
U.S. Office Action for U.S. Appl. No. 11/725,865 mailed Mar. 4, 2011.
U.S. Office Action for U.S. Appl. No. 11/633,880 mailed Mar. 17, 2011.
Japanese Office Action dated Nov. 20, 2012 for Japanese Application No. 2009554447 from Japan Patent Office, pp. 1-4, Tokyo, Japan (Machine generated English-language translation included, pp. 1-2).
Chinese Office Action dated Aug. 28, 2012 for Chinese Application No. 200880016311.X from China Patent Office, pp. 1-24, People's Republic of China (English-language translation included, pp. 1-15).
U.S. Notice of Allowance for U.S. Appl. No. 11/633,880 (SAM2A-P.29) mailed Oct. 24, 2012, United States.
U.S. Final Office Action for U.S. Appl. No. 12/544,994 (SAM2A-P. 78) mailed Oct. 23, 2012, United States.
Office Action dated Sep. 8, 2011 from U.S. Appl. No. 12/544,994.
Office Action dated Jan. 17, 2012 from U.S. Appl. No. 12/544,994.
Office Action dated Jun. 1, 2011 from U.S. Appl. No. 11/803,826.
Office Action dated Jun. 15, 2011 from U.S. Appl. No. 11/969,778.
Office Action dated Jun. 27, 2011 from U.S. Appl. No. 11/725,865.
Office Action dated Jul. 6, 2011 from U.S. Appl. No. 11/789,609.
Office Action dated Oct. 6, 2010 from U.S. Appl. No. 11/981,019.
Office Action dated Dec. 29, 2009 from U.S. Appl. No. 11/981,019.
Final Office Action dated Mar. 16, 2011 from U.S. Appl. No. 11/981,019.
Final Office Action dated Jun. 17, 2010 from U.S. Appl. No. 11/981,019.
Office Action dated Aug. 2, 2011 from U.S. Appl. No. 11/713,312.
Office Action dated Aug. 19, 2011 from U.S. Appl. No. 11/821,938.
Office Action dated Aug. 22, 2011 from U.S. Appl. No. 11/981,019.
Final Office Action dated Sep. 1, 2011 from U.S. Appl. No. 12/263,089.
Final Office Action dated Sep. 21, 2011 from U.S. Appl. No. 11/633,880.
Final Office Action dated Sep. 27, 2011 from U.S. Appl. No. 11/969,778.
Notice of Allowance dated Nov. 1, 2011 from U.S. Appl. No. 11/821,938.
Final Office Action dated Nov. 10, 2011 from U.S. Appl. No. 11/803,826.
Notice of Allowance dated Jan. 30, 2012 from U.S. Appl. No. 11/981,019.
Office Action dated Mar. 30, 2012 from U.S. Appl. No. 11/633,880.
Copernic Inc., http://copernic.com/en/products/desktop search/index.html, Sep. 18, 2008.
Google Inc., webhp, http://www.google.com/webhp?complete-1&hl-en, downloaded Sep. 25, 2008, pg. 1.
Tivo Inc., http://www.tivo.com, downloaded Sep. 19, 2008, 1 page.
"Computing Meng Individual Project, ANSES—Automatic News Summarization and Extraction System, "http://mmis.doc.ic.ac.uk/pr-1.wong-2002/overview.html, downloaded Sep. 24, 2008, 4 pages.
Miyauchi et al., "Highlight Detection and Indexing in Broadcast Sports Video by Collaborative Processing of Text, Audio, and Image," Sytstems and Computers in Japan, vol. 34, No. 12, 2003, pp. 22-31, Translated from Denshi Joho Tsushin Gakkai Ronbunshi, vol. J85-D-II, No. 11, Nov. 2002, pp. 1692-1700.
Nitta, Naoka et al., "Automatic Story Segmentation of Closed-Caption Text for Semantic Content Analysis of Broadcasted Sports Video," 8th International Workshop on Multimedia Information Systems, 2002, pp. 110-116.
Miura, K. et al., "Automatic Generation of a Multimedia Encyclopedia from TV Programs by Using Closed Captions and Detecting Principal Viedo Objects," Proceedings of the Eigth IEEE International Sympsosium on Miltumedia (ISM ' 06), 2006, IEEE, 8 pages.
Chinese Office Action dated Aug. 14, 2009 from Chinese Patent Application No. 200810082621.3.
Chinese Office Action dated Mar. 25, 2010 from Chinese Patent Application No. 200810082621.3.
Chinese Office Action dated Feb. 1, 2011 from Chinese Application No. 200710196237.1.
Chinese Office Action dated Sep. 23, 2011 from Chinese Application No. 200880016311.X.
Chinese Office Action dated Sep. 8, 2011 from Chinese Application No. 200880009063.6.
Chinese Office Action dated Apr. 17, 2012 from Chinese Application No. 200880016311.X.
Japanese Office Action dated Mar. 21, 2012 from Japanese Application No. 2009-554447.
Japanese Office Action dated Apr. 10, 2012 from Japanese Application No. 2010-508303.
U.S. Advisory Action for U.S. Appl. No. 12/544,994 mailed Jan. 23, 2013.
Chinese Office Action dated Mar. 7, 2013 for Chinese Application No. 200880016311.X from China Intellectual Property Office, pp. 1-25, People's Republic of China (English-language translation included, pp. 1-16).

* cited by examiner

FRAMEWORK FOR CORRELATING CONTENT ON A LOCAL NETWORK WITH INFORMATION ON AN EXTERNAL NETWORK

FIELD OF THE INVENTION

The present invention relates to content correlation in different networks.

BACKGROUND OF THE INVENTION

The number of networked devices in local area networks, such as home networks, is on the rise, and so is the amount of content stored on them. Typically, consumers store and access several types of content (e.g., audio, video, image and other data files) in different formats using their home network devices. In addition to accessing such local content, home users also commonly access broadcast data streams via external networks such as live television/cable networks, the Internet, etc.

Media players, such as Windows Media Player, Real player, etc., extract related metadata information for music CDs (that are currently being played) from the Internet. Typically, such media players maintain a standard set of metadata types capable of being extracted and displayed, and rely on specific websites to obtain the required metadata.

However, the user cannot access other information related to the content (e.g., lyrics of a song, artist biography, etc., for a music CD). This is because such information is not among the standard metadata information available from specific Internet data sources that conventional media players are pre-configured to access. Further, the media player relies on specific Internet data sources (e.g., websites, remote data bases, etc.). If the data sources become inaccessible, the media player fails to obtain even the standard metadata information, even though the required information may be available from some other data source.

Further, since the amount of information available from the Internet is continually on the rise, a user can typically find information on the Internet that is related to content stored in his home network. The user can also find large quantities of related information in different formats (e.g., structured, semi-structured and unstructured) via multiple sources. As such, users are typically as interested in accessing information on the Internet as they are in accessing their own network content. However, conventional approaches do not enable seamless access to such related information. Conventionally, the user manually performs a search for the desired information using an Internet search engine or uses a web browser to directly access websites of interest. Thus, the user is forced to search for and analyze large quantities of information to identify/access the exact information he is looking for.

Desktop search applications such as Google Desktop Search and Copernic are extensions of Internet searches where users can search for content on their PCs. However, drawbacks of such search extensions include: (1) requiring users to form queries and to refine the queries in order to obtain desired results, (2) requiring computing resources that far exceed what consumer electronic devices provide for analyzing humongous search results, and (3) requiring input devices such as a keyboard to enter a significant amount of query text for searching. Therefore, there is a need for a method and system that enables simplified and seamless access to available content.

BRIEF SUMMARY OF THE INVENTION

The present invention provides a method and system for correlating content available from a local network with information on an external network. The correlation framework identifies information related to content available on the local network of interest to the user and also identifies one or more external sources that contain such related information. Then, the correlation framework extracts data related to the identified information from the external sources, and determines correlations between the identified information and the data extracted from the external network.

Said framework further identifies additional correlations between the various available data (local data and Internet data) to the user. Internet search engines are used to obtain related information/metadata, thereby increasing the probability of finding the required information.

The user can look up several different types of information related to the local data that the user accesses. As such, the user is not restricted to choose from a standard list of available related/metadata information. Rather, correlations between different types of data are determined and presented to the user. The users can utilize CE devices for searching information using a small number of key strokes, without requiring a typical keyboard. Information is searched and suggested to the users based on context, to augment user experience of using CE devices. Therefore, the user can obtain desired Internet information with minimum involvement in search query construction.

These and other features, aspects and advantages of the present invention will become understood with reference to the following description, appended claims and accompanying figures.

DETAILED DESCRIPTION OF THE INVENTION

The present invention provides a method and system that implement a framework for correlating content available from a local network with information on an external network. This enables seamless access to content available from the local network as well as related information available from external sources.

In one implementation, the present invention provides a framework for correlating home network content with information on the Internet, providing a user with seamless access to content stored in the home network and any related data available from the Internet. The user is not restricted to choose from a standard list of metadata information. Rather, the user is enabled to look up several different types of information related to the content in the home network. Correlations between the content in the home network and related information in the Internet are determined and presented to the user. Correlations refer to associations between different information.

In one example, Internet search engines and specific Internet service providers along with specific websites (web pages) are used to access information and metadata related to the user's query. In another example, only Internet search engines are used to obtain information and metadata related to the user's query.

Figure 1:
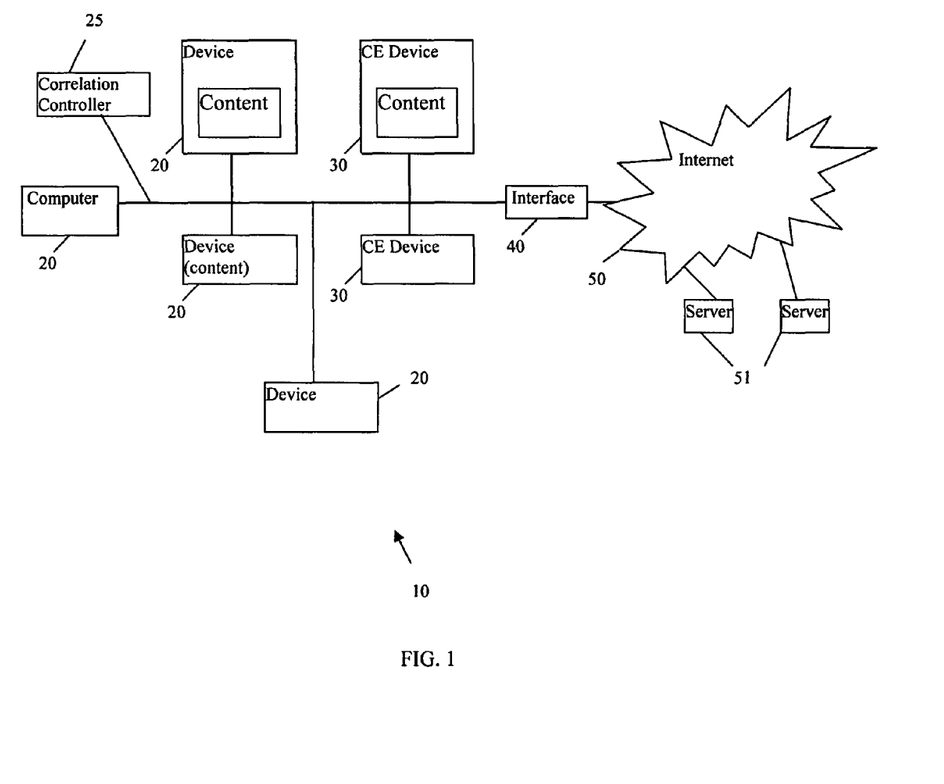
FIG. 1 shows a functional block diagram of an example network that implements an embodiment of the present invention.

FIG. 1 shows a functional architecture of an example network 10 including a local network (e.g., a home network), embodying aspects of the present invention. The network 10 comprises devices 20 which may include content and consumer electronic (CE) devices 30 (e.g., TV, MP3 player, cell phone, PDA, etc.) which may include content, and an interface 40 that connects the network 10 to an external network 50 (e.g., the Internet). The external network is connected to one or more servers 51. Though the devices 20 and 30 are shown separately, a single physical device can include one or more logical devices. In this example, the present invention effectively delivers the power of the Internet to users using devices 20 and CE devices 30.

The devices 20 and 30, respectively, can implement the HTTP protocol that uses UPnP for communication therebetween. Though in the example described herein the HTTP protocol is utilized by the network 10, those skilled in the art will recognize that the present invention is useful with other network communication protocols (e.g., Jini, HAVi, IEEE 1394, etc.). The network 10 can comprise a wired network, a wireless network, or a combination thereof.

Figure 2:
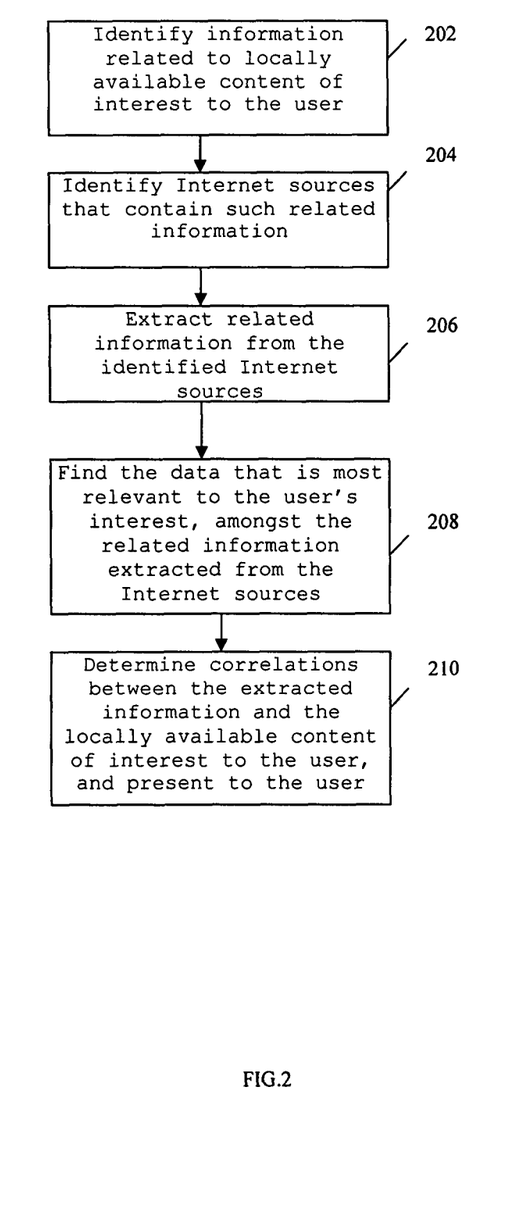
FIG. 2 shows a flowchart of an embodiment of a process in a framework for correlating local content with information on external sources, according to an embodiment of the present invention.

The network 10 embodies an example framework for correlating home content with information on the Internet, according to the present invention. FIG. 2 shows a process 200 which implements the example framework, including the following steps:

Step 202: Identifying information related to content available on the local network of interest to the user.

Step 204: Identifying Internet sources that contain such related information.

Step 206: Extracting appropriate portions of such related information from the identified Internet sources.

Step 208: Finding data that is most relevant to the user's interest, amongst the related information extracted from the Internet sources.

Step 210: Determining correlations between the extracted information and the content available on the local network, of interest to the user and present the extracted information and the correlations to the user.

Figure 3:
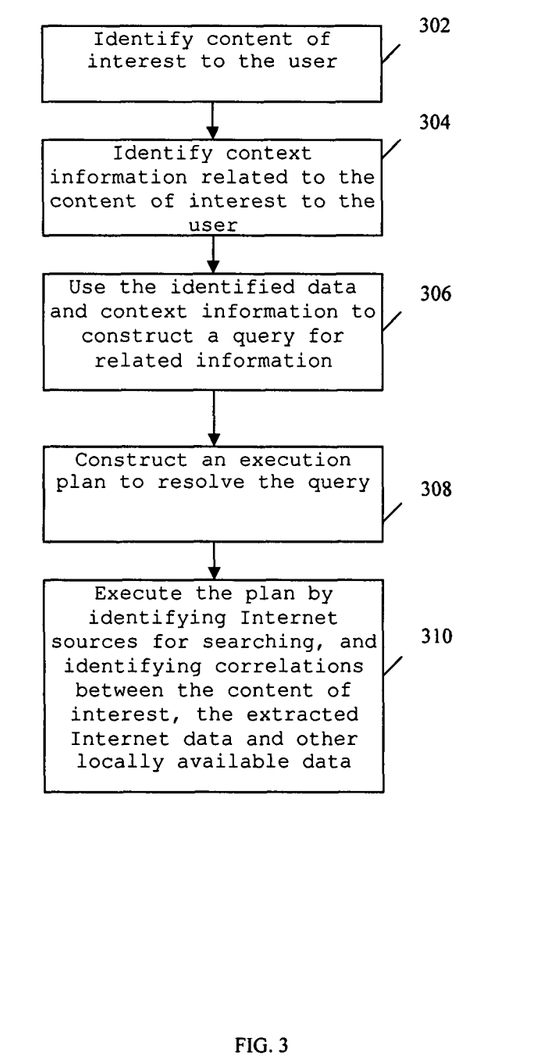
FIG. 3 shows a flowchart of an embodiment of the steps of identifying external information related to local content and constructing correlations therebetween, according to an embodiment of the present invention.

FIG. 3 shows an example process 300 for identifying information on the Internet that is related to local content, and then constructing correlations between the identified information and the local content. In this example, said local content comprises content of interest to the user. The process 300 includes the following steps:

Step 302: Identifying content of interest to the user. This can be determined from a query submitted by the user, from content currently accessed by the user, from history/preferences of the user indicating the user's interests, etc.

Step 304: Identifying context information, such as keywords, related to the identified content of interest to the user.

Step 306: Using the identified content and context information to construct a query for information related thereto. The query is constructed so as to represent the user's intentions and context via appropriate keywords.

Step 308: Constructing an appropriate execution plan to resolve the query by searching various information sources.

Step 310: Executing the plan by: (a) Identifying appropriate Internet sources for extracting information based on the query; and (b) Identifying correlations between the content of interest to the user, the extracted Internet information and other locally available data.

In one example, the user is interested in purchasable albums by the artist "Sting." The user's interest may be determined in different ways such as from a user request in a query, or from a query generated based on observations of the user's activities such as playing music by "Sting" on a MP3 player in the home network, etc. To resolve this query, the purchasable albums by "Sting" are identified by accessing the Internet. Then, based on the fact that the artist "Sting" is a member of the band "Police" (known from another Internet source), it is correlated that purchasable albums by the band "Police" are also relevant to the user's query. Therefore, the purchasable albums by "Police" are also identified. The list of purchasable albums by both "Sting" and the band "Police" are then presented to the user.

In another example, before presenting the list of purchasable albums by both "Sting" and the band "Police" to the user, it is determined if any albums by "Sting" and the "Police" are already available in the home network (e.g., on a device 20 or 30 in FIG. 1). Using this additional information, the list is modified such that the user is only presented with a listing of the purchasable albums by "Sting" and the band "Police" that are not available in the home network.

Figure 4:
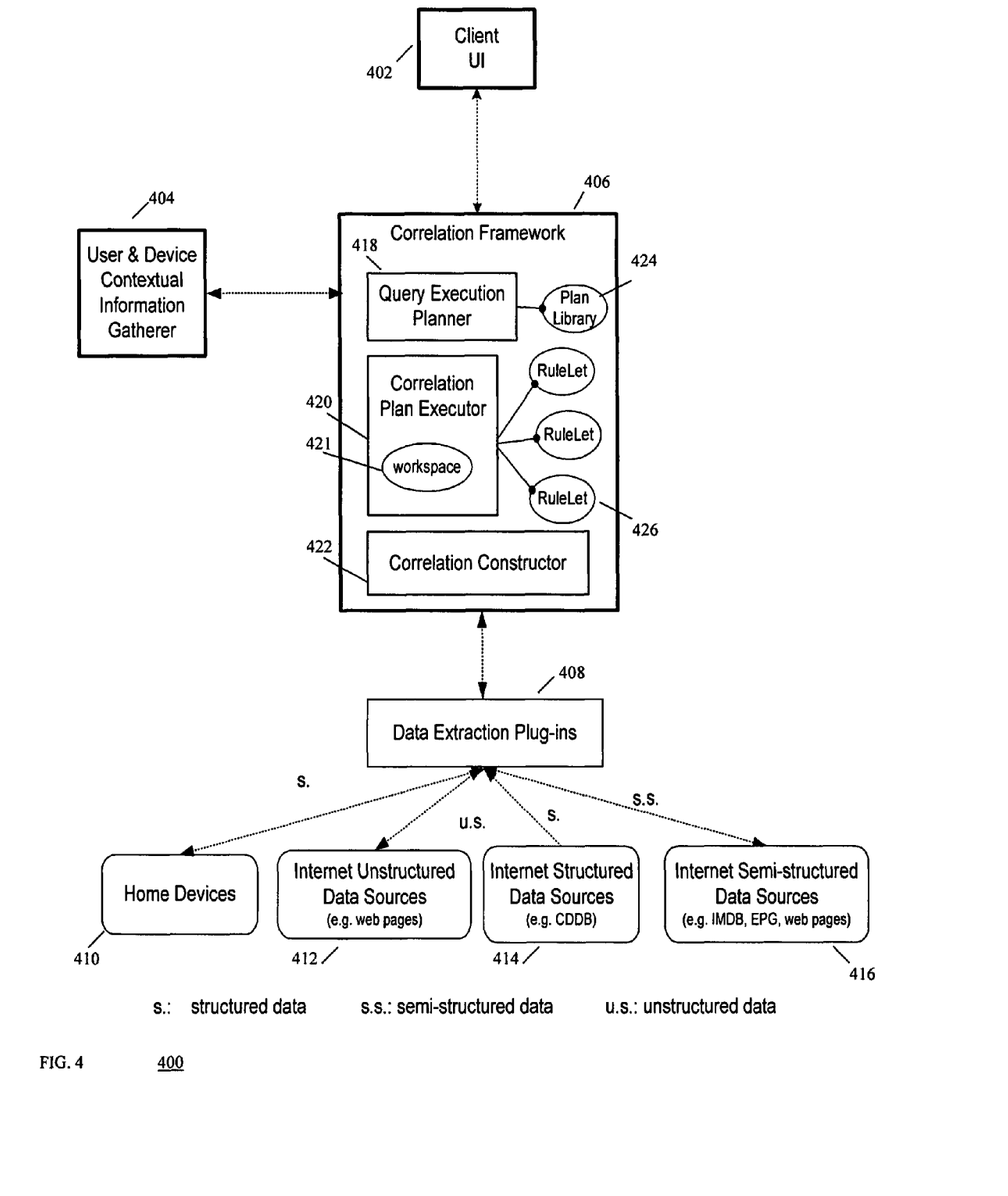
FIG. 4 shows a functional block diagram of a framework for correlating local content with information from external sources, according to an embodiment of the present invention.

FIG. 4 shows a functional block diagram of a system 400 which implements a framework for correlating local content with information in external sources such as the Internet, according to an embodiment of the present invention. The system 400 utilizes the following components: a Client User Interface (UI) 402, a User & Device Contextual Information Gatherer (CIG) 404, a Correlation Framework (CF) 406, Data Extraction Plug-ins 408, Home Devices 410 (e.g., devices 20 or 30 in FIG. 1 such as HDTV, a VCR, a DVD player, etc.), Internet Unstructured Data Sources (e.g., web pages, etc.) 412, Internet Structured Data Sources (e.g., CDDB, etc.) 414 and Internet Semi-Structured Data Sources (e.g., IMDB, EPG, web pages, etc.) 416.

The Client UI 402 provides interfaces to the users to access local information and any related Internet information that the CF 406 identifies. The Client UI 402 also allows the user to submit specific queries (e.g., "Get purchasable albums by artist "Sting"") to the CF 406.

The CF 406 resolves the queries that are based on the content of interest to the user, and provides to the user information obtained based on the queries, along with information derived using identified correlations. The CF 406 uses the Client UI 402 to display said information on a display for user viewing and selection.

The CIG 404 and the Data Extraction Plug-ins 408 extract local and Internet information. The CIG 404 extracts information about current user activity and device activity, about content stored on devices, about user history and preferences, etc.

The CF 406 includes a Query Execution Planner (QEP) 418, a Correlation Plan Executor (CPE) 420, a Correlation Constructor 422, a Plan Library 424 and multiple RuleLets 426. The QEP 418 retrieves a plan from the Plan Library 424 to resolve a query. A plan includes the various steps to be executed in order to resolve a particular type of query. Each plan step includes one or more RuleLet-references corresponding to the RuleLets 426. RuleLets 426 are specialized processes that execute a specific task (e.g., extracting metadata information for a music album from the Internet, extracting biography of an artist, etc.). Each plan also optionally includes details about the necessary parameters and/or required output (type).

The QEP 418 obtains any available contextual information about the user from the CIG 404 and customizes the plan based on the contextual information.

An example XML plan is shown in Table 1 below, which specifies the steps to execute in order to obtain albums by an artist that are available for purchase on the Internet and not available in the home network.

TABLE 1

Sample Plan - GetPurchasableAlbumsbyArtist

```
<? xml version="1.0"?>
<Plan>
  <PlanStep>
    <RuleLet>GetDataRule</RuleLet>
    <OutputType>AllPurchasableAlbumURLs</OutputType>
    <Scope>Internet</Scope>
  </PlanStep>
  <PlanStep>
    <RuleLet>GetDataRule</RuleLet>
    <OutputType>BandList</OutputType>
    <Scope>Internet</Scope>
  </PlanStep>
  <PlanStep>
    <RuleLet>GetDataRule</RuleLet>
    <OutputType>PurchasableAlbumsByBand</OutputType>
    <Scope>Internet</Scope>
  </PlanStep>
  <PlanStep>
    <RuleLet>GetContentNotInHomeRule</RuleLet>
    <InputType>Internet-
AllPurchasableAlbumURLs</InputType>
    <InputType>Internet-
PurchasableAlbumsByBand</InputType>
    <InputType>Local-AlbumsByArtist</InputType>
    <OutputType>AlbumList</OutputType>
    <Scope>CIWorkspace</Scope>
  </PlanStep>
</Plan>
```

The CPE 420 invokes the appropriate RuleLets 426 as specified in each step of the plan. The CPE 420 executes the plan using various Data Extraction Plug-ins 408. The Data Extraction Plug-ins 408 extracts the desired data from sources including the local devices/media repository and/or the Internet (e.g., via Internet search engines such as Google, Yahoo, etc., and seed sources such as CDDB.org, allmusic.com). The CPE 420 also maintains a workspace 421 and stores the query search results from the Internet at each plan step until the whole plan is executed.

The CC 422 analyzes the search results provided by the CPE 420, and identifies correlations amongst the search results and the locally available information.

The Internet Unstructured Data Sources 412 comprise data segments (e.g., free text data segment, or marked up data segment, etc.) whose semantics cannot be analyzed (e.g., Google search 'pope' or <other>pope </other>, etc.). The Internet Structured Data Sources 414 comprise XML data with tags that define closely the semantics of small sections of free-form data (e.g., CD song information <artist>Sting</artist>, etc.). The Internet Semi-Structured Data Sources 416 comprises data with tags (e.g., XML) that define part of the free-form data, but do not describe the semantics of significant sections of the data (e.g., EPG data sections <review> . . . </review>, etc.).

The system 400 resolves a user query and determines correlations between local and Internet data, according to the following steps:
1. The Client UI 402 receives the user's request (query) for information, and forwards it to the QEP 418.
2. The QEP 418 retrieves an appropriate plan from the Plan Library 424 for resolving the query, and customizes the plan based on user contextual information from the CIG 404.
3. The QEP 418 provides the plan to the CPE 420 for execution.
4. The CPE 420 parses the plan and sequentially executes each step in the plan, wherein:
   a. The CPE 420 internally invokes appropriate RuleLets 426.
   b. The invoked RuleLets 426 execute the appropriate Data Extraction Plug-ins 408 to search for information (e.g., on the Internet) to satisfy the query.
   c. The CPE 420 stores the search results in the workspace 421 and checks if there are any other steps to be executed. Steps (a)-(c) are repeated until all steps (except the last one) in the plan are executed.
   d. The CC 422 uses the search results stored in the workspace 421 to identify correlations between the search results and the locally available data. Then, the CC 422 provides the search results and correlations to the Client UI 402 for display to the user.

An example scenario for resolving a user query in the system 400 includes the following steps:
1. The CF 406 is installed and running on a CE device 410 (e.g., the TV) in user John's living room.
John chooses to listen to a music album "X" by the artist "Sting."
2. A Client UI 402 on the TV 410 in the living room displays this information (i.e., that John is listening to album "X"). A remote control for the TV 410 allows John to access/navigate the Client UI 402.
3. While listening to a particular track in the album, John wishes to access more information about the song and selects/enters into the Client UI 402 the information that he is interested in (e.g., more purchasable albums by artist "Sting," etc.).
4. The Client UI 402 on the TV 410 provides the track/album information and the user selection to the CF 406. Using the CIG 404 and the appropriate Data Extraction Plug-ins 408, the CF 406 gathers the available metadata and other information about the track/album from a local media repository or the device that the album is stored on (e.g., in John's home network).
5. The QEP 418 retrieves an appropriate plan from the Plan Library 424 to resolve this user request.
6. The QEP 418 passes this plan to the CPE 420 along with other contextual information obtained by the CIG 404 and from the Client UI 402.
7. The CPE 420 parses the plan and executes each step of the plan by invoking the appropriate RuleLets 426 as specified in the plan (e.g., Table 1: "GetDataRule", "GetContentNotInHomeRule").
8. The RuleLets 426 internally use appropriate Data Extraction Plug-ins 408 to retrieve the requested information (e.g., from the Internet).
9. The CPE 420 stores the results of the execution of each of the plan steps in the workspace 421. As such, the workspace 421 now includes, e.g. a list of purchasable albums by "Sting" and the band "Police."
10. The CPE 420 provides to the CC 422 the details of the last plan step to be executed. The CC 422 retrieves information about locally available albums by "Sting" and the band "Police" (e.g., in the home network). Then, the CC 422 identifies in the search results stored in the workspace 421, the list of albums that are purchasable on the Internet and constructs a list of purchasable albums by "Sting" and the band "Police" that are not available locally (e.g., in the home network).

11. The CC 422 provides this final list to the Client UI 402 for presentation to the user, John, on the TV.

The modules 404, 406 and 408 in FIG. 4 can be implemented as stand alone modules in the network 10 (FIG. 1). Further, two or more of the modules 404, 406 and 408 can be implemented in one device in the network 10 such as a correlation controller device 25, or in a device 20 or a CE device 30. The GUI 402 can be show on a device in the network 10 capable of displaying information, such as a CE device 30.

As such, the present invention enables a user to utilize a CE device, such as a TV, to search for information using a small number of keys inputs, and without a typical keyboard. Further, users can obtain desired Internet information with minimum or no involvement in query construction. Information is suggested to the users based on context extracted from the user activities and the local content, in order to augment the user experience in using CE devices to seamlessly access information available locally and in external sources.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of providing suggested content, comprising:
    employing a processor in a consumer electronic (CE) device for:
    providing an information gatherer for identifying information comprising context related to user activities and content available on the local network including the current media content being accessed by the user, of interest to the user, wherein the local network comprises a home network including the consumer electronic device, and
    identifying one or more Internet sources that contain related information to the identified information, wherein the Internet sources are external to the local network;
    providing an extractor for extracting data related to keywords associated with said identified information by using the keywords associated with the identified information to construct a query for querying the identified Internet sources, wherein the extractor includes plug-ins for extracting information from Internet structured data sources, Internet unstructured data sources, and Internet semi-structure data sources; and
    providing a correlator for determining correlations between the identified information and the data extracted from the identified Internet sources;
    determining suggested media content based on the determined correlations between the identified information and the data extracted from the identified Internet sources;
    removing media content from the suggested content based on content already available within the local network: and
    providing remaining suggested media content to a user for selection
    wherein the user is provided with relevant suggestions for additional media content different than that currently being accessed and that is not already present on the local network to assist a user to search for information relevant to the user with reduced query inputs to a remote control unit.

2. The method of claim 1 wherein identifying information related to media content available on the local network, of interest to the user further includes identifying information of interest to the user based on a query submitted by the user, the query being used as a portion of the information used to determine the correlations.

3. The method of claim 1 wherein identifying information related to content available on the local network, of interest to the user further includes determining content previously accessed by the user, content stored on devices in the local network and content from user preferences.

4. The method of claim 1 wherein determining correlations further includes finding data in the extracted data that is most relevant to said identified information.

5. The method of claim 1 wherein extracting data related to said identified information from the external sources further includes:
    gathering the identified information of interest to the user;
    using the identified information to construct a query;
    constructing a plan to resolve the query; and
    executing the plan to extract data related to said identified information from the Internet sources.

6. The method of claim 5 further including determining additional correlations between the identified information and extracted data based on the context information.

7. The method of claim 1, wherein removing content from the suggested media content based on content available within the local network comprises determining whether content related to the data extracted from the external network sources is available on the local network.

8. The method of claim 1, wherein a remote control device controls searching the identified information.

9. The method of claim 1, wherein the remaining suggested content comprising content available for purchase via selection.

10. The method of claim 5, wherein the plan includes necessary parameters and required output type, and the plan is customized based on the context information.

11. A correlation system for correlating data in a local network with data in one or more external network sources and suggesting media content based on data correlations, comprising:
    a processor;
    a contextual information gatherer that is configured to identify information comprising context related to media content available on the local network of interest to the user and user activities wherein the local network comprise a home network including consumer electronic devices;
    a data extractor that is configured to extract data related to said identified information by using the identified information construct a query for querying Internet sources, including Internet structured data sources, Internet unstructured data sources, and Internet semi-structure data sources; and a correlation module in a device in the local network, that is configured for determining correlations between the identified information and the data extracted from the Internet sources, determining suggested media content based on the determined correlations between the identified information and the data extracted from the external network sources, removing media content from the suggested content based on content already available within the local network, and providing remaining suggested media content to a user for selection;

wherein the user is provided with relevant suggestions for additional media content different than that currently being accessed and that is not already present on the local network to assist a user to search for information relevant to the user with reduced query inputs to a remote control unit.

12. The correlation system of claim 11 further comprising a user interface that is configured to present the correlations to the user.

13. The correlation system of claim 11 wherein the contextual information gatherer is further configured to identify information of interest to the user based on a query submitted by the user.

14. The correlation system of claim 11 wherein the contextual information gatherer is further configured to identify information of interest to the user based on content previously accessed by the user, content stored on devices in the local network and content from user preferences.

15. The correlation system of claim 11 further comprising:
a query execution planner that is configured to form a query based on the identified information, wherein the data extractor is further configured to extract data related to said identified information from the external sources based on the query.

16. The correlation system of claim 11 wherein the correlation module is further configured to determine correlations by finding data in the extracted data that is most relevant to said identified information.

17. The correlation system of claim 15 wherein:
the contextual information gatherer is further configured to gather further context information related to the identified information of interest to the user; and
the query execution planner is further configured to form a query based on the context information and said identified information, and construct a plan to resolve the query.

18. The correlation system of claim 17 further comprising a plan executor that is configured to execute the plan by controlling the data extractor to extract data related to said identified information from the external sources.

19. The correlation system of claim 18 wherein the correlation module further comprises a correlation constructor that is configured to analyze the extracted data to find correlations between the extracted data and the identified information.

20. The correlation system of claim 19 wherein the plan identifies Internet sources and the data extractor is further configured to extract data from the identified Internet sources.

21. A consumer electronics device capable of being connected to a local network to assist a user to search for information relevant to the user with reduced query inputs, comprising:
a processor;
a contextual information gatherer that is configured to identify information comprising context related to content available on the local network of interest to the user and user activities associated with the current media content being accessed by the user;
a data extractor that is configured to construct a query to extract data related to said identified information from external Internet sources; and
a correlation module that is configured to determine correlations between the identified information and the data extracted from the Internet sources, determining suggested content based on the determined correlations between the identified information and the data extracted from the Internet sources, removing content from the suggested content based on content already available within the local network, and providing remaining suggested content to a user for selection;
wherein the user is provided with relevant suggestions for additional media content different than that currently being accessed and that is not already present on the local network to assist a user to search for information relevant to the user with reduced query inputs to a remote control unit.

22. The consumer electronics device of claim 21 further comprising a user interface that is configured to present the correlations to the user.

23. The consumer electronics device of claim 21 wherein the contextual information gatherer is further configured to identify information of interest to the user based on a query submitted by the user.

24. The consumer electronics device of claim 21 wherein the contextual information gatherer is further configured to identify information of interest to the user based on content currently or previously accessed by the user, content stored on devices in the local network and user preferences.

25. The consumer electronics device of claim 21 wherein the correlation module includes a query execution planner that is configured to form a query based on the identified information, wherein the data extractor is further configured to extract data related to said identified information from the Internet sources based on the query.

26. The consumer electronics device of claim 21 wherein the correlation module is further configured to determine correlations by finding data in the extracted data that is most relevant to said identified information.

27. The consumer electronics device of claim 25 wherein:
the contextual information gatherer is further configured to gather further context information related to the identified information of interest to the user; and
the query execution planner is further configured to form a query based on the context information and said identified information, and construct a plan to resolve the query.

28. The consumer electronics device of claim 27 further comprising a plan executor that is configured to execute the plan by controlling the data extractor to extract a related to said identified information from the Internet sources.

29. The consumer electronics device of claim 28 wherein the correlation module further comprises a correlation constructor that is configured to analyze the extracted data to find correlations between the extracted data and the identified information.

30. The consumer electronics device of claim 29 wherein the plan identifies Internet sources and the data extractor is further configured to extract data from the identified Internet sources.

31. The consumer electronics device of claim 21 wherein the local network comprises a home network including consumer electronic devices.

32. A method of correlating data on a local network with data from one or more external network sources, comprising:

employing a processor in a consumer electronic device for:

providing an information gatherer for identifying information comprising context related to user activities with the consumer electronic device and user activities with media content, available on the local network, of interest to the user, and identifying one or more external network sources that contain such related information, wherein the external network sources are external to the local network;

constructing a query representing the user's intentions and context from said identified information, wherein said identified information comprises keywords;

providing an extractor having plug-ins for extracting data related to said keywords from the Internet sources, the extractor having plug-ins for Internet unstructured data sources, Internet structured data source, and Internet semi-structured data sources; and providing a correlator for determining correlations between said keywords and the data extracted from the external network sources, determining suggested content based on the determined correlations between the identified information and the data extracted from the Internet sources, removing content from the suggested media content based on media content already available within the local network, and providing remaining suggested media content to a user for selection;

wherein the user is provided with relevant suggestions for additional media content different than that currently being accessed and that is not already present on the local network to assist a user to search for information relevant to the user with reduced query inputs to a remote control unit.

* * * * *